(12) United States Patent
Chen

(10) Patent No.: US 9,428,208 B1
(45) Date of Patent: Aug. 30, 2016

(54) BABY STROLLER WITH A SUSPENSION UNIT

(71) Applicant: BOR LI CO., LTD., Tainan (TW)

(72) Inventor: Mei-Feng Chen, Tainan (TW)

(73) Assignee: Bor Li Co., Ltd., Tainan (WF)

( * ) Notice: Subject to any disclaimer, the term of this patent is extended or adjusted under 35 U.S.C. 154(b) by 0 days.

(21) Appl. No.: 14/945,544

(22) Filed: Nov. 19, 2015

(51) Int. Cl.
 *B62B 9/18* (2006.01)
 *B62B 7/14* (2006.01)
(52) U.S. Cl.
 CPC .. *B62B 9/18* (2013.01); *B62B 7/14* (2013.01)
(58) Field of Classification Search
 CPC ......... B62B 3/007; B62B 5/08; B62B 5/082; B62B 5/085; B62B 7/00; B62B 7/002; B62B 7/004; B62B 7/006; B62B 7/08; B62B 7/086; A61G 5/08; A61G 2005/0841; A61G 7/06; A61G 7/062; A61G 7/064; A61G 7/066; A61G 7/068; A61G 7/08; A61G 7/083; A61G 7/086
See application file for complete search history.

(56) References Cited

U.S. PATENT DOCUMENTS

| | | | |
|---|---|---|---|
| 6,345,864 B1 * | 2/2002 | Rivera | A47D 13/00 297/130 |
| 7,753,398 B2 * | 7/2010 | Yang | B62B 9/102 280/642 |

* cited by examiner

*Primary Examiner* — John Walters
*Assistant Examiner* — James Triggs
(74) *Attorney, Agent, or Firm* — Rosenberg, Klein & Lee

(57) ABSTRACT

A baby stroller includes a base and a suspension unit is connected to the base. The suspension unit has a movable rod which is movably connected to the suspension unit. A support frame is connected to the distal end of the movable rod and a seat or a bed is connected to the support frame. The suspension unit absorbs shocks and vibration transferred from the road. The distance between the seat or the bed and the base is adjusted by the movement of the movable rod. The seat or the bed can be rotated to face the user or to face front.

9 Claims, 19 Drawing Sheets

BABY STROLLER WITH A SUSPENSION UNIT

BACKGROUND OF THE INVENTION

1. Fields of the Invention

The present invention relates to a baby stroller, and more particularly, to a baby stroller with a suspension unit for absorbing shocks transferred from the ground. The sit or bed can be pivoted to face the user or to face front.

2. Descriptions of Related Art

The conventional baby stroller includes a frame with a seat or a bed on the top of the frame, and three or four wheels connected to the frame so that a baby can comfortably sit in the seat and the user can easily move the baby stroller. The conventional baby stroller is foldable for convenient carry and storage. However, the seat or bed is fixed at a certain height so that the user may not convenient to put the baby in the seat or to move the baby from the seat. The fixed height may not be suitable for the users of different heights. Furthermore, the conventional baby stroller does not have a proper suspension unit so that the shocks or vibration will be directly transferred to the baby who may be scared or even injured.

The seat or bed usually face front and cannot be rotated, in some situations, the parent may want the baby to see him/her. Although the seat or bed of some baby strollers can be re-adjusted its orientation, the processes are complicated and become a burden for most of the users.

The present invention intends to provide a baby stroller to eliminate the shortcomings mentioned above.

SUMMARY OF THE INVENTION

The present invention relates to a baby stroller and comprises a base and a suspension unit which is connected to the base. The suspension unit has a movable rod which is movably connected to the suspension unit. A support frame is connected to the distal end of the movable rod. The distance between the support frame and the base is adjusted by the movement of the movable rod.

Preferably, the movable rod is rotatable relative to the suspension unit. A positioning seat is mounted to the suspension unit and has at least one restriction portion. The support frame has at least one control rod which is located corresponding to the at least one restriction portion. The at least one control rod is connected to the at least one restriction portion when the at least one control rod is located at a locked position. The at least one control rod is disconnected from the at least one restriction portion when the at least one control rod is located at an unlocked position. The support frame is pivotable when the movable rod is pivoted.

Preferably, the support frame has a tube which has at least one passage. At least one slide is located in the at least one passage and connected to the at least one control rod. The at least one slide has a stepped face. At least one movable block is inserted into the at least one passage and located substantially perpendicular to the at least one control rod. The at least one movable block has a rail which is an inclined surface and located corresponding to the stepped face of the at least one slide. The at least one slide is moved up and down when stepped face of the at least one slide is moved along the rail.

Preferably, the suspension unit is a pneumatic cylinder or a hydraulic cylinder.

Preferably, the movable rod is a piston rod of the pneumatic cylinder or the hydraulic cylinder. The movable rod has a valve which is connected to and controlled by an operation member.

Preferably, the support frame has a tube which has a hole. The valve is located on one side of the hole. The operation member is connected to the hole.

Preferably, the base has a support member and the suspension unit is connected to the support member.

Preferably, the support member has at least one first link and at least one sleeve. The at least one first link is pivotably connected to the frame. The at least one sleeve is slidably connected to the frame. When the at least one sleeve is moved toward an end of the at least one first link, the suspension unit is substantially perpendicular to the base. When the at least one sleeve is moved toward the other end of the at least one first link, the suspension unit is substantially parallel to the base.

Preferably, a seat or a bed is connected to the support frame and located opposite to the suspension unit.

Preferably, a frame is connected to the support frame and the seat or the bed is connected to the frame.

The primary object of the present invention is to provide a baby stroller wherein the suspension unit absorbs shocks and vibration from the road so that when the baby stroller is moved on an uneven road or stops suddenly, the baby in the seat or the bed is not scared or slip to enhance the comfort and safety of the baby.

Another object of the present invention is to provide a baby stroller wherein the movable rods are moved up or down by operating the control rod so as to adjust the height of the seat or the bed, such that the user can easily put the baby into the seat or the bed, or remove the baby from the seat or the bed without injury of the user's waist or knees.

Yet another object of the present invention is to provide a baby stroller, when moving the movable blocks, the slides are moved up to release the control rods from the restriction portions so that the seat or the bed is rotated by the movable rod. When the seat or the bed is rotated to the desired position, the slides are moved back to engage the control rods with the restriction portions to set the seat or the bed. The function allows the user to set the seat or the bed to let the baby in the seat or the bed to face the user or to face front.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
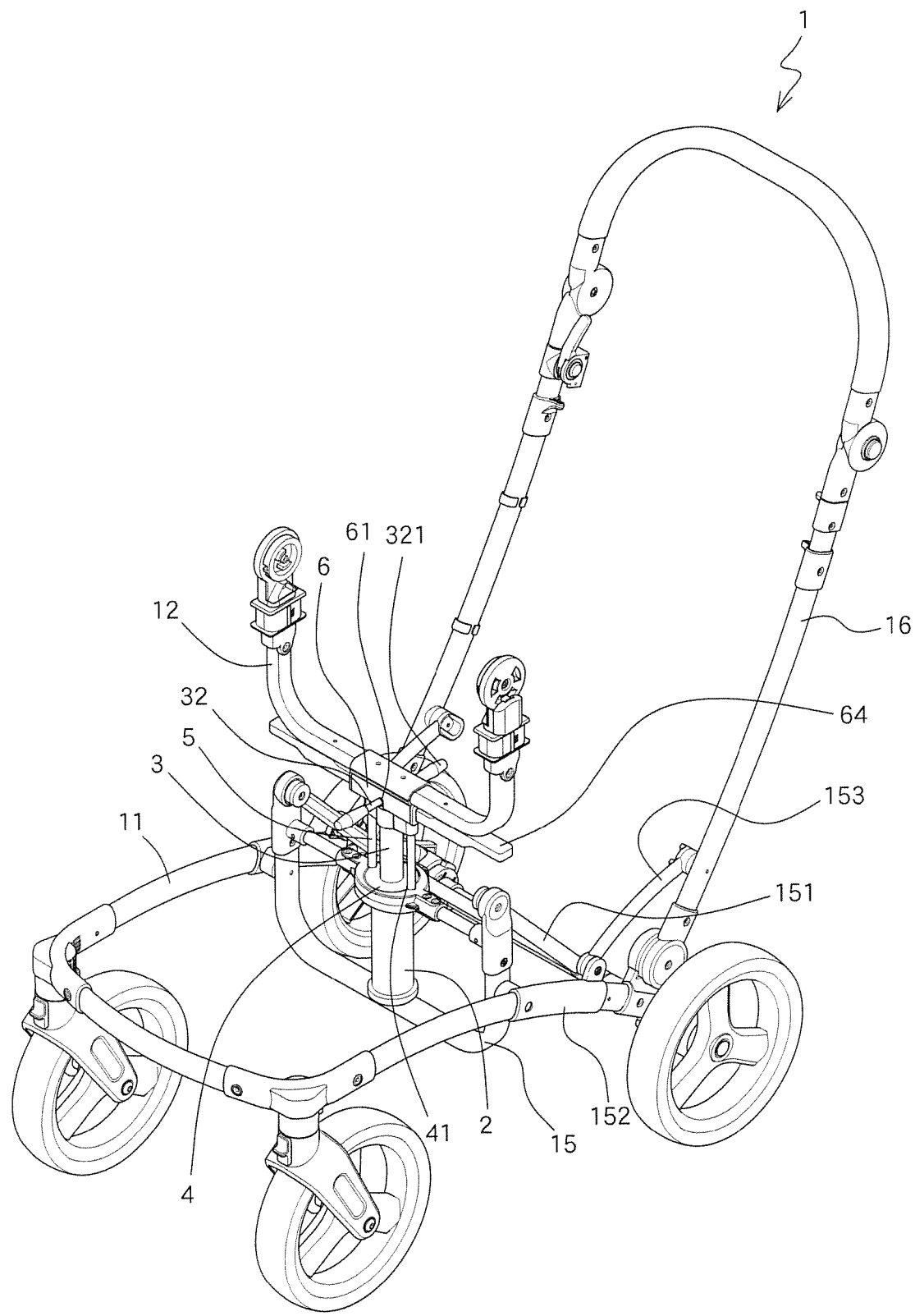
FIG. 1 is a perspective view to show the baby stroller of the present invention.
Figure 2:
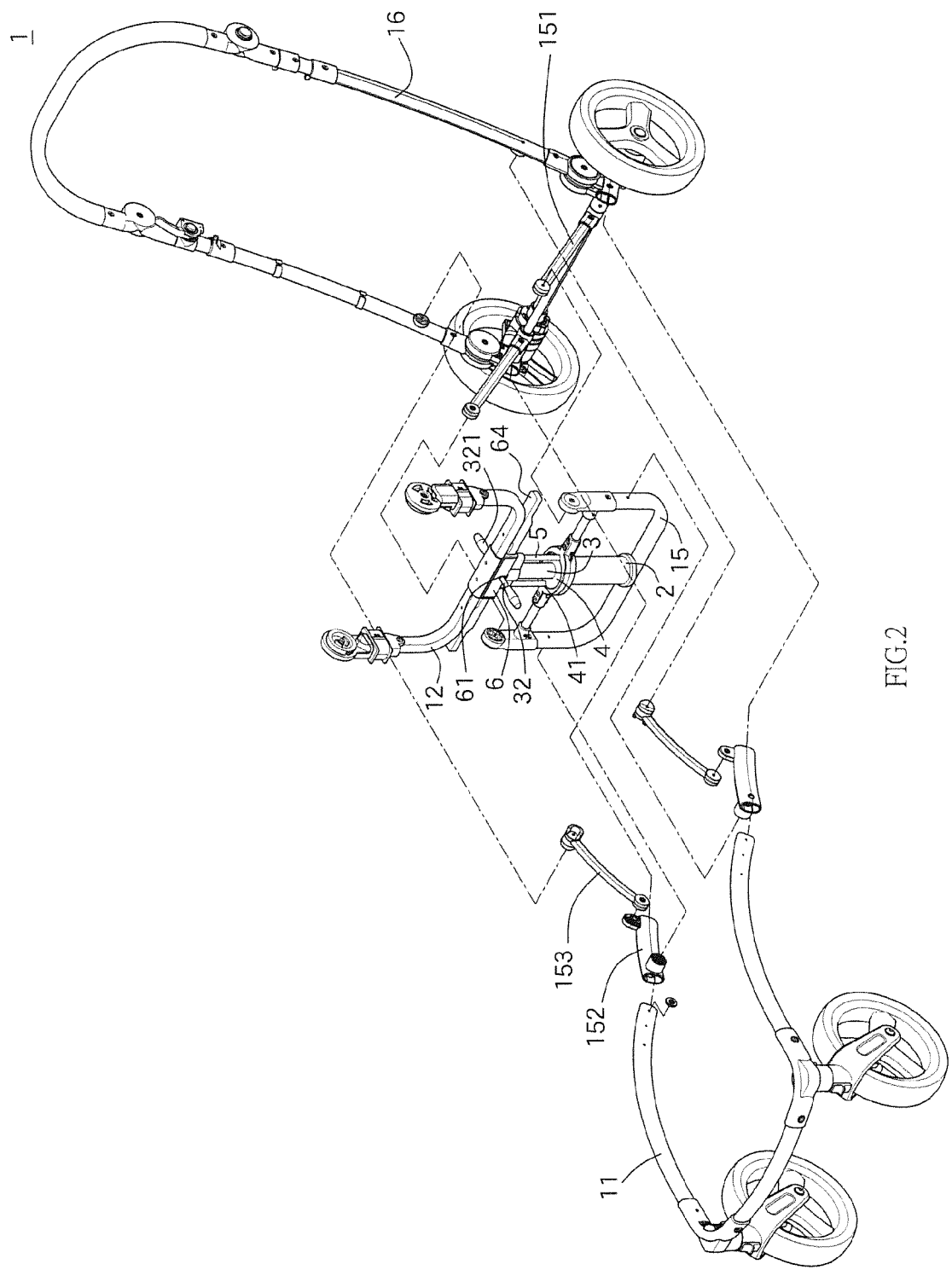
FIG. 2 is an exploded view of the baby stroller of the present invention.
Figure 3:
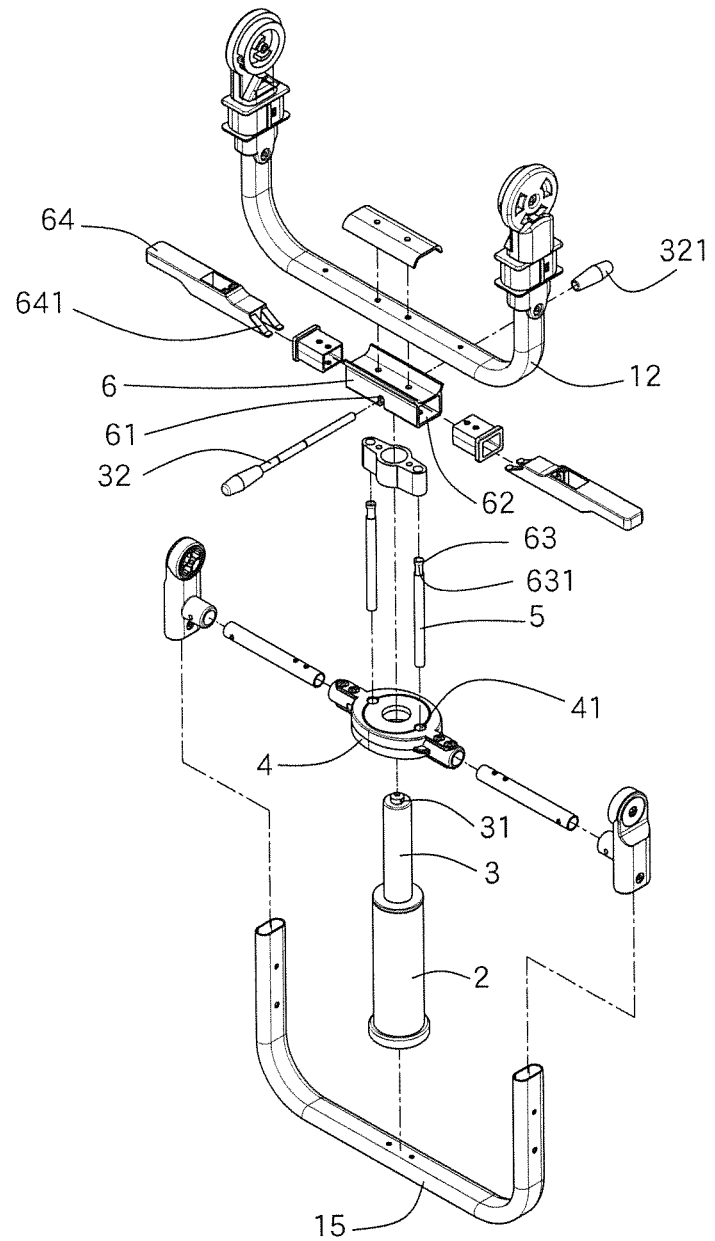
FIG. 3 is an exploded view to show the support frame, the suspension unit and the support member of the baby stroller of the present invention.
Figure 4:
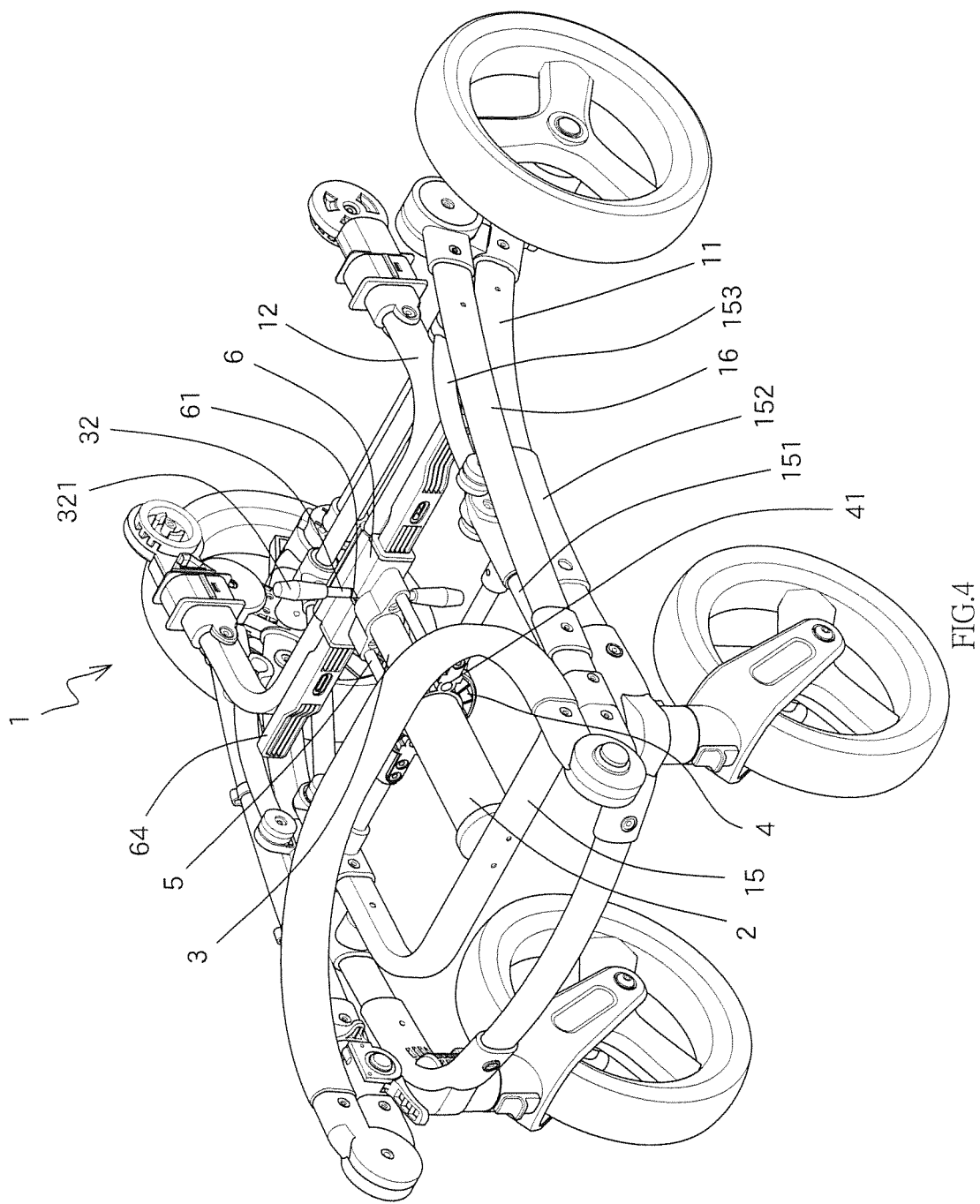
FIG. 4 shows the folded status of the baby stroller of the present invention.

Referring to FIGS. 1 to 5, the baby stroller of the present invention comprises a base 11 and a suspension unit 2 is connected to the base 11. The suspension unit 2 has a movable rod 3 which is movably connected to the suspension unit 2. A support frame 12 is connected to the distal end of the movable rod 3, such that the distance between the support frame 12 and the base 11 can be adjusted by movement of the movable rod 3. The movable rod 3 is rotatable relative to the suspension unit 2. A positioning seat 4 is mounted to the suspension unit 2 and has two restriction portions 41. The support frame 12 has two control rods 5 which are located corresponding to the restriction portions 41. The control rods 5 are connected to the restriction portions 41 when the control rods 5 are located at a locked position. The control rods 5 are disconnected from the restriction portions 41 when the control rods 5 are located at an unlocked position. The support frame 12 is pivotable when the movable rod 3 is pivoted.

Figure 5:
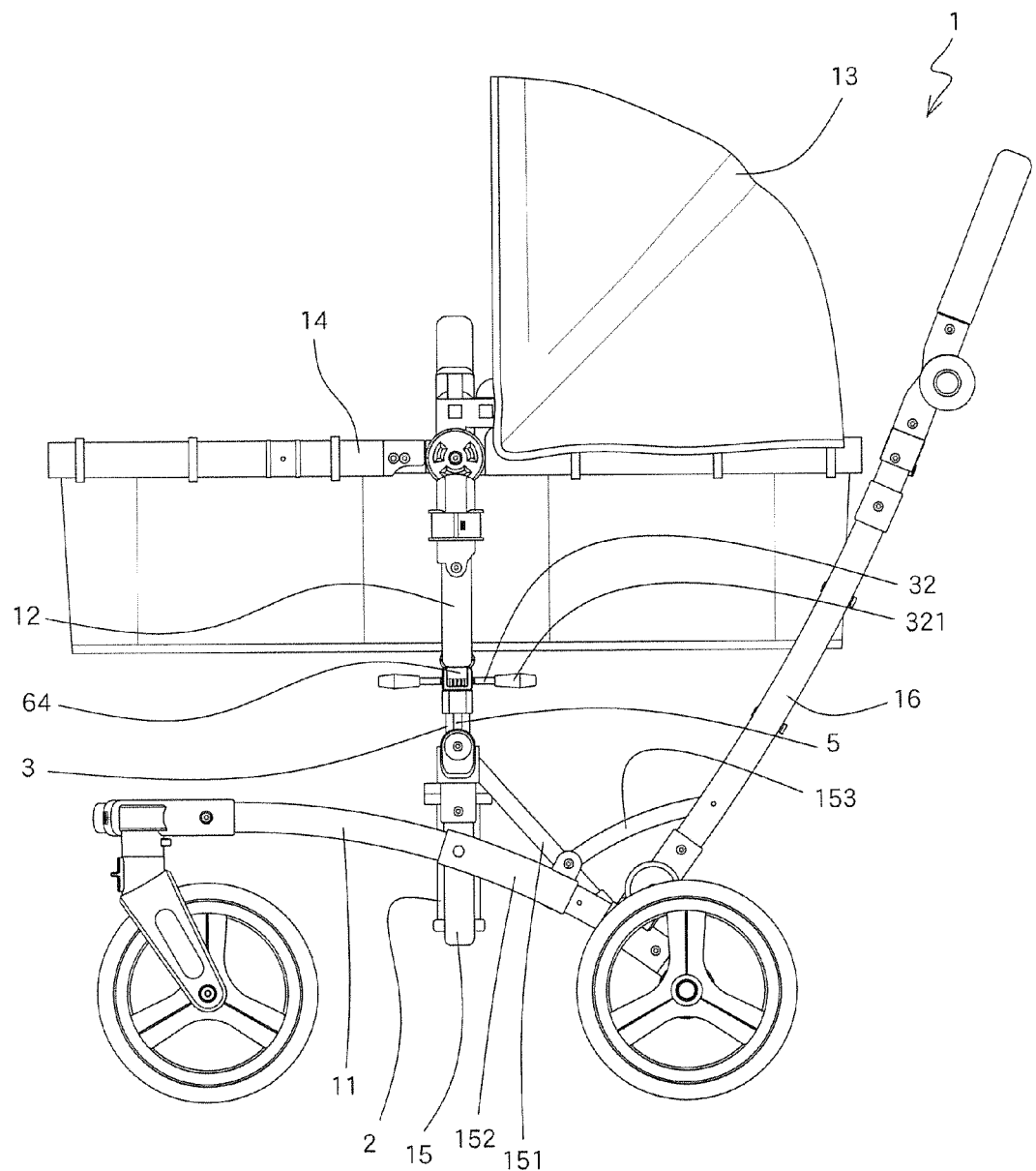
FIG. 5 is a side view of the baby stroller of the present invention, wherein the bed is horizontally positioned.
Figure 6:
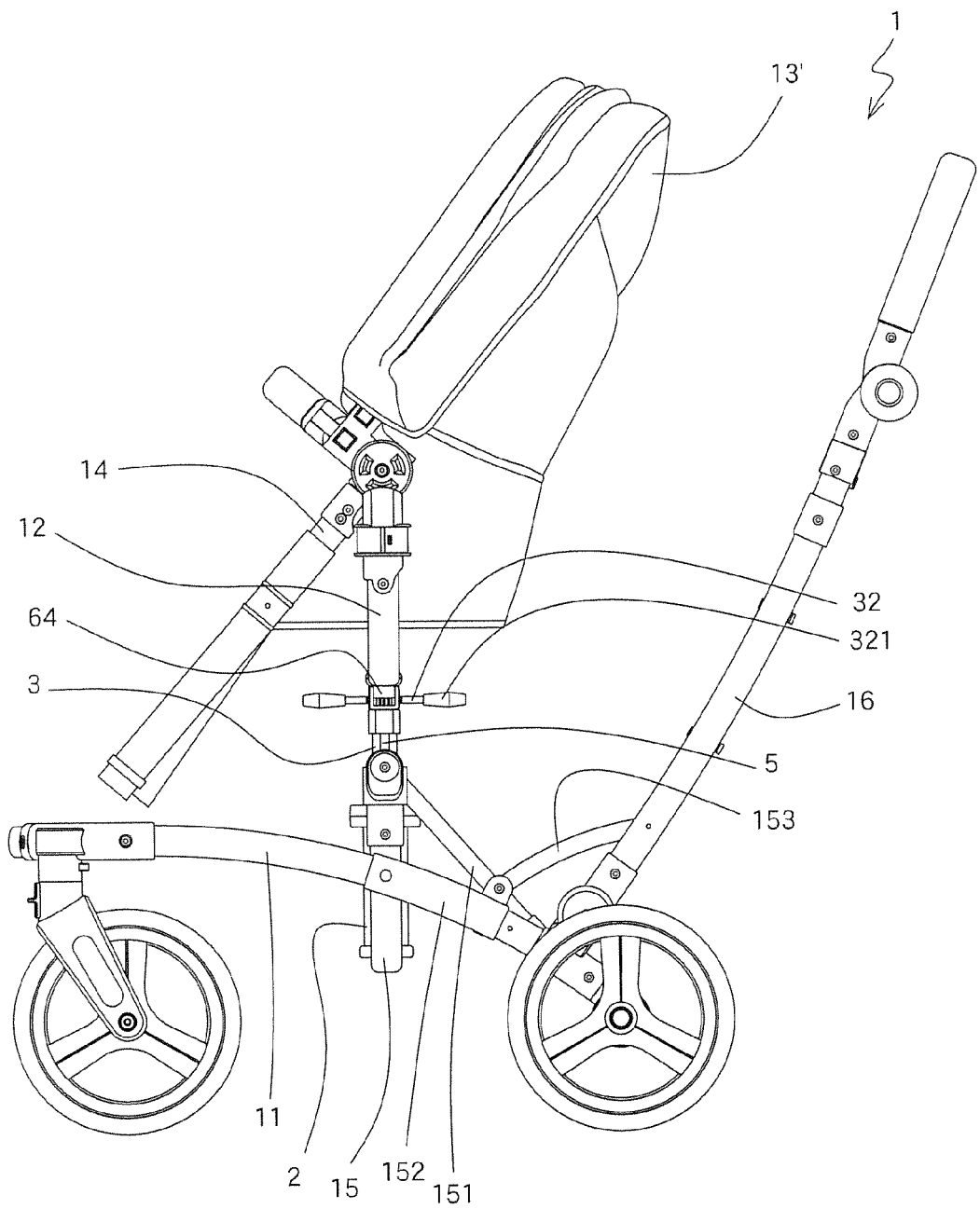
FIG. 6 is a side view of the baby stroller of the present invention wherein the seat is tilt.

As shown in FIGS. 5 and 6, a seat 13' or a bed 13 is connected to the support frame 12 and located opposite to the suspension unit 2. In an embodiment, a frame 14 is connected to the support frame 12 and the seat 13' or the bed 13 is connected to the frame 14.

The base 11 has a support member 15 and the suspension unit 3 is connected to the support member 15. The support member 15 has two first links 151 and two sleeves 152, wherein the first links 151 are pivotably connected to the base 11. The sleeves 152 are slidably connected to the base 11. The base 11 has a handle 16 pivotably connected thereto. The sleeves 152 are pivotably connected to the a handle 16 by two second links 153 so that both of the handle 16 and the support member 15 are able to be folded in the base 11. The suspension unit 2 can also be folded with the support member 15. When the sleeves 152 are moved toward one end of the first links 151, the suspension unit 2 is substantially perpendicular to the base 11. When the sleeves 152 are moved toward the other end of the first links 151, the suspension unit 2 is substantially parallel to the base 11.

Figure 7:
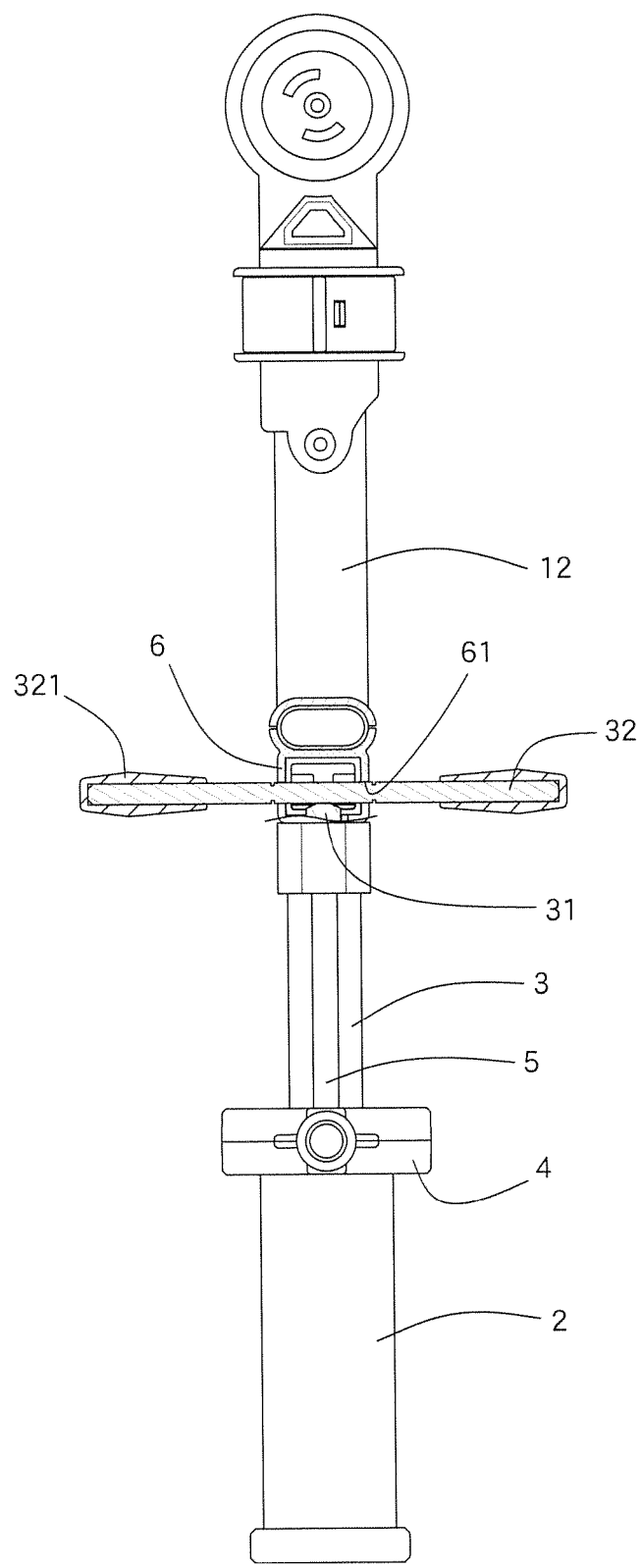
FIG. 7 is a partially cross sectional view to show that the movable rod is in the locked position, and movable rod of the suspension unit is set at a fixed height.

In one embodiment, the suspension unit 2 is a pneumatic cylinder or a hydraulic cylinder. The movable rod 3 is a piston rod of the pneumatic cylinder or the hydraulic cylinder. The movable rod 3 has a valve 31 which is connected to and controlled by an operation member 32. As shown in FIG. 7, when the operation member 32 is not activated, and the valve is in the closed status, the movable rod 3 is not movable and is secured at the position so that the seat 13' or the bed 13 connected to the movable rod 3 is avoided from vibration and shocks by the suspension unit 2. When the support member 15 is located at the upright position, and the suspension unit 2 is substantially perpendicular to the base 11 which is parallel to the road. Preferably, a smaller angle is formed between the suspension unit 2 and the road, so that the suspension unit 2 is able to absorb shocks and vibration from the road, and the seat 13' or the bed 13 is maintained stable and the baby in the seat 13' or the bed 13 feels comfortable. Because there is a smaller angle formed between the suspension unit 2 and the road, so that even if the baby stroller 1 stops suddenly, the baby in the seat 13' or the bed 13 does not slip upward and backward suddenly to prevent the baby from being scared.

Figure 8:
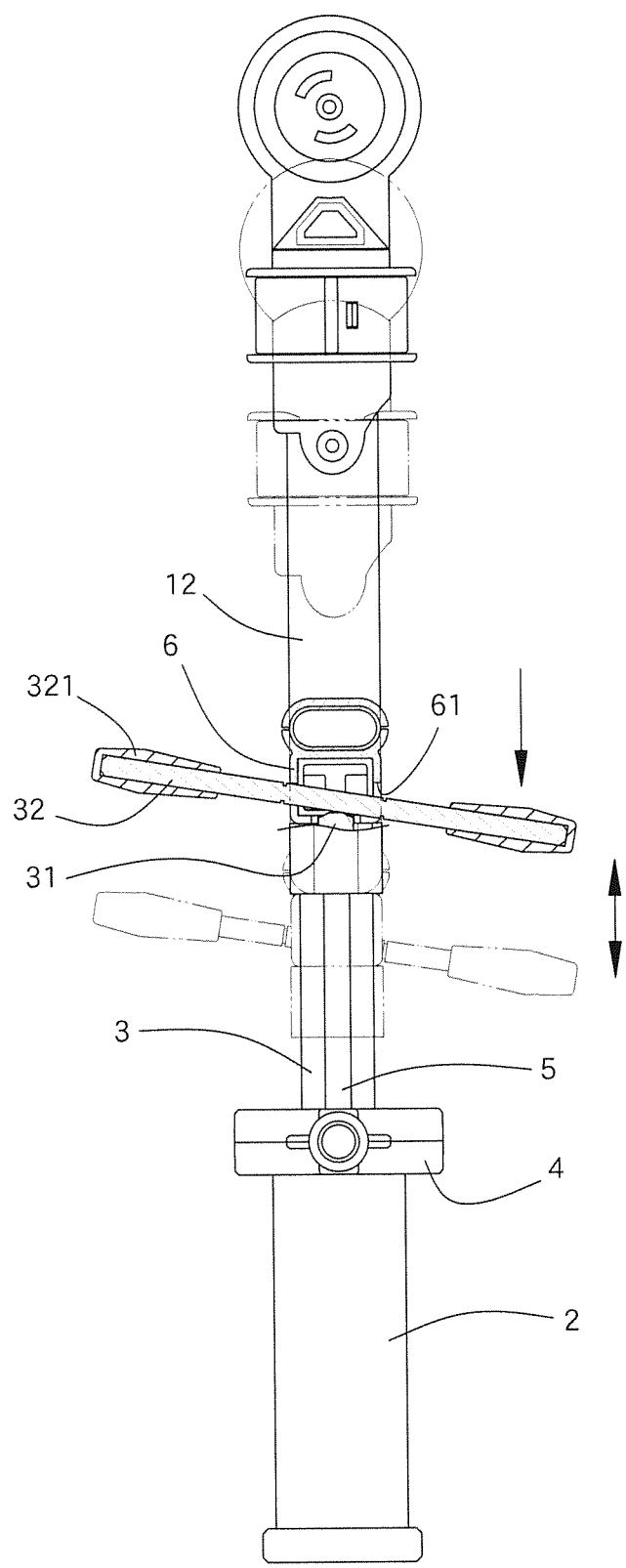
FIG. 8 is a partially cross sectional view to show that the movable rod is in the unlocked position, and movable rod of the suspension unit is adjustable.
Figure 9:
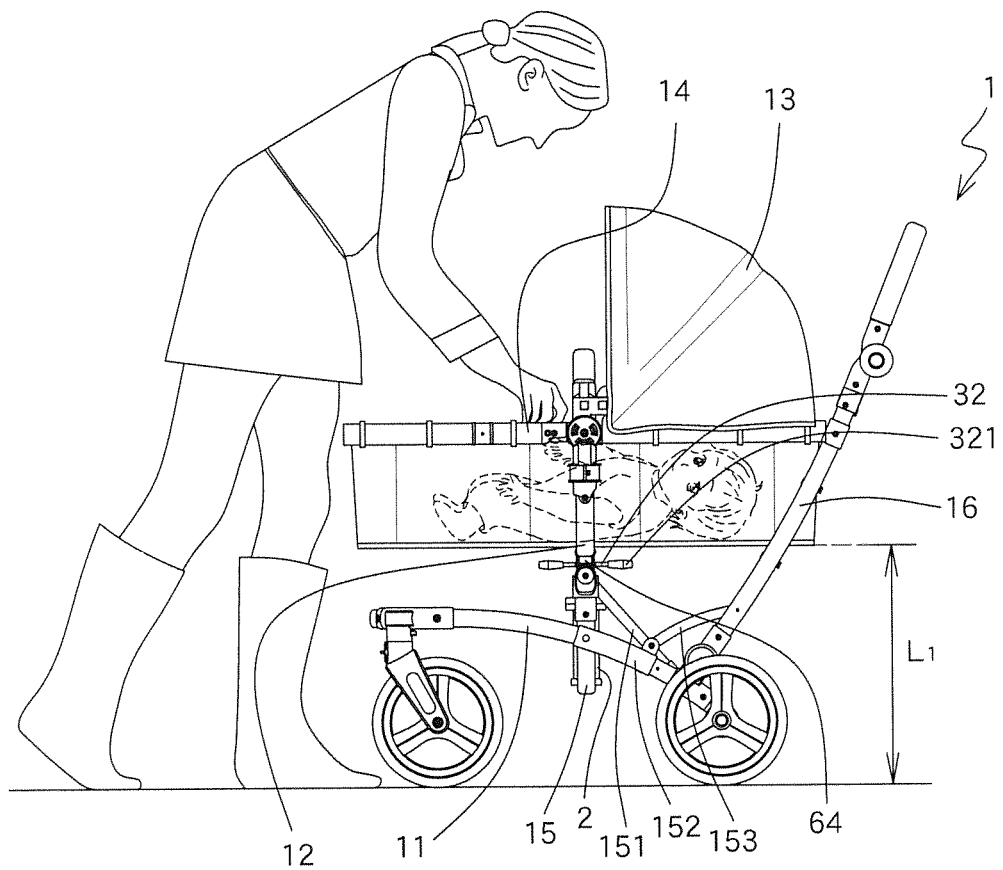
FIG. 9 shows that the user has to bend her waist to access the baby in the bed which is located horizontally at a lower position.
Figure 10:
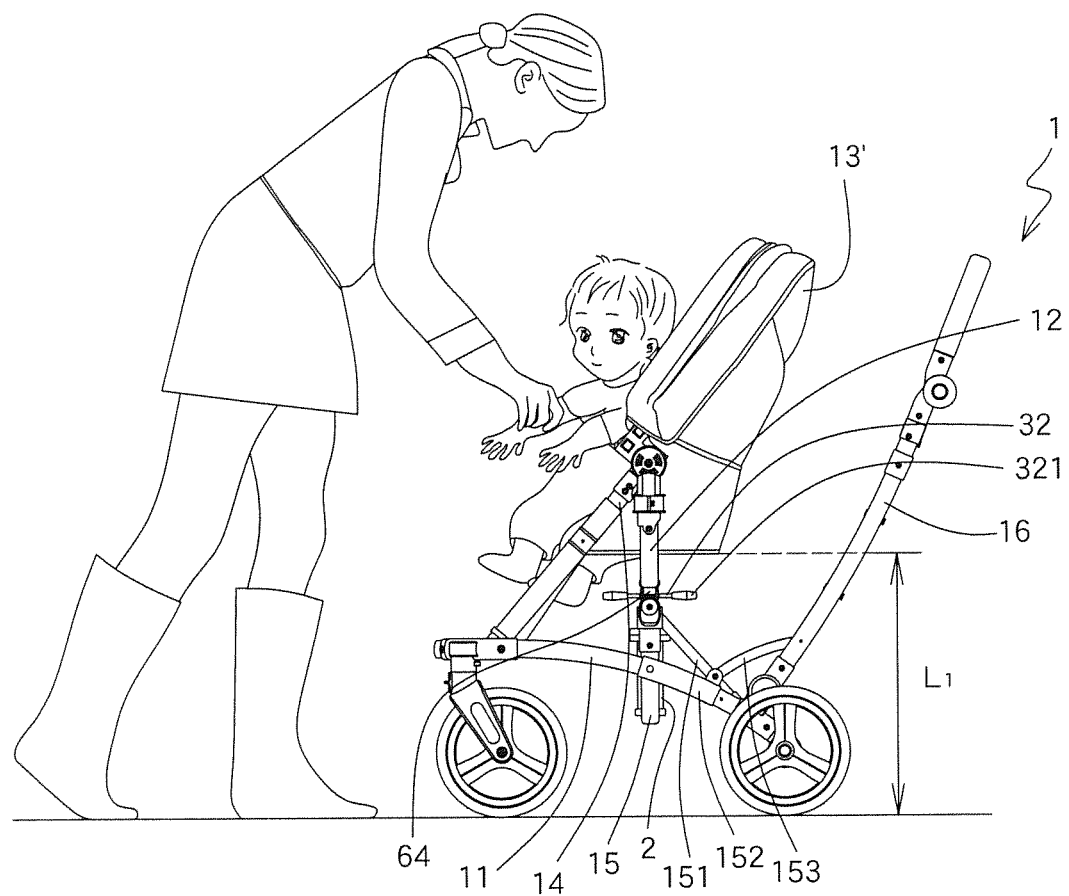
FIG. 10 is another view to show that the user has to bend her waist to access the baby in the seat which is tilt and positioned at a lower position.
Figure 11:
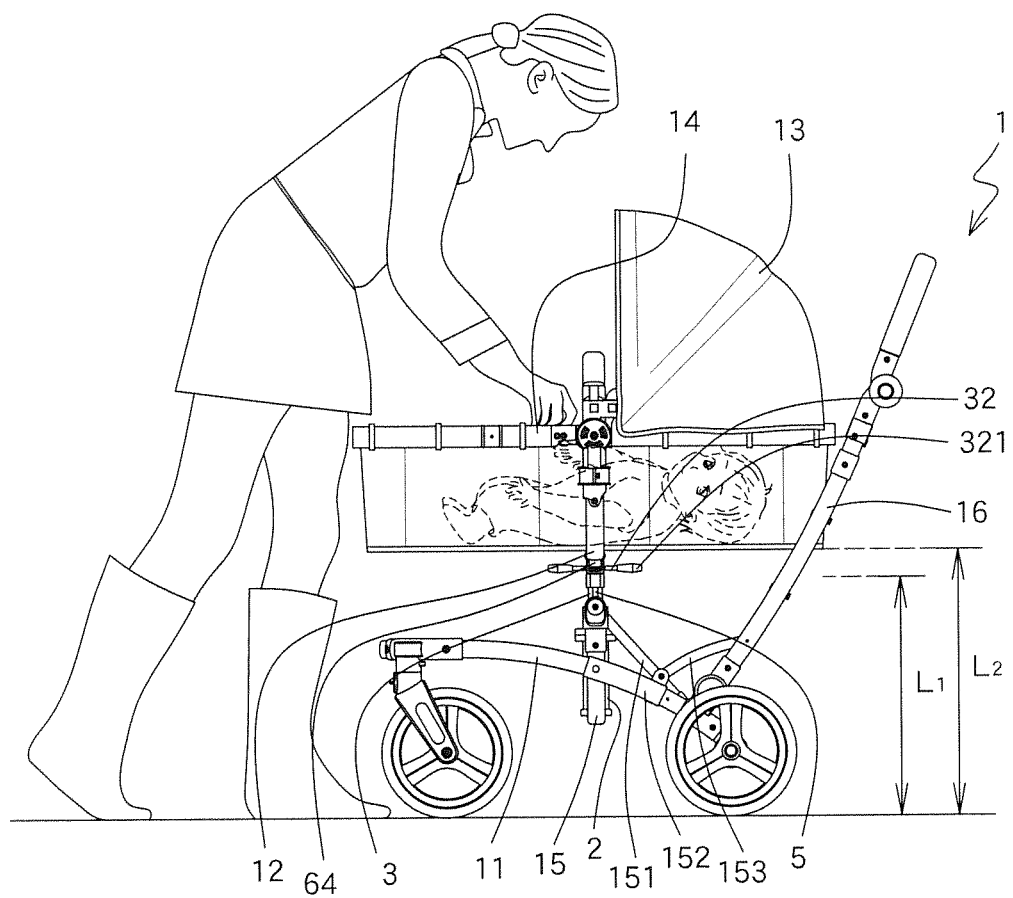
FIG. 11 shows that the user does not need to bend her waist to access the baby in the bed which is located horizontally at a higher position.
Figure 12:
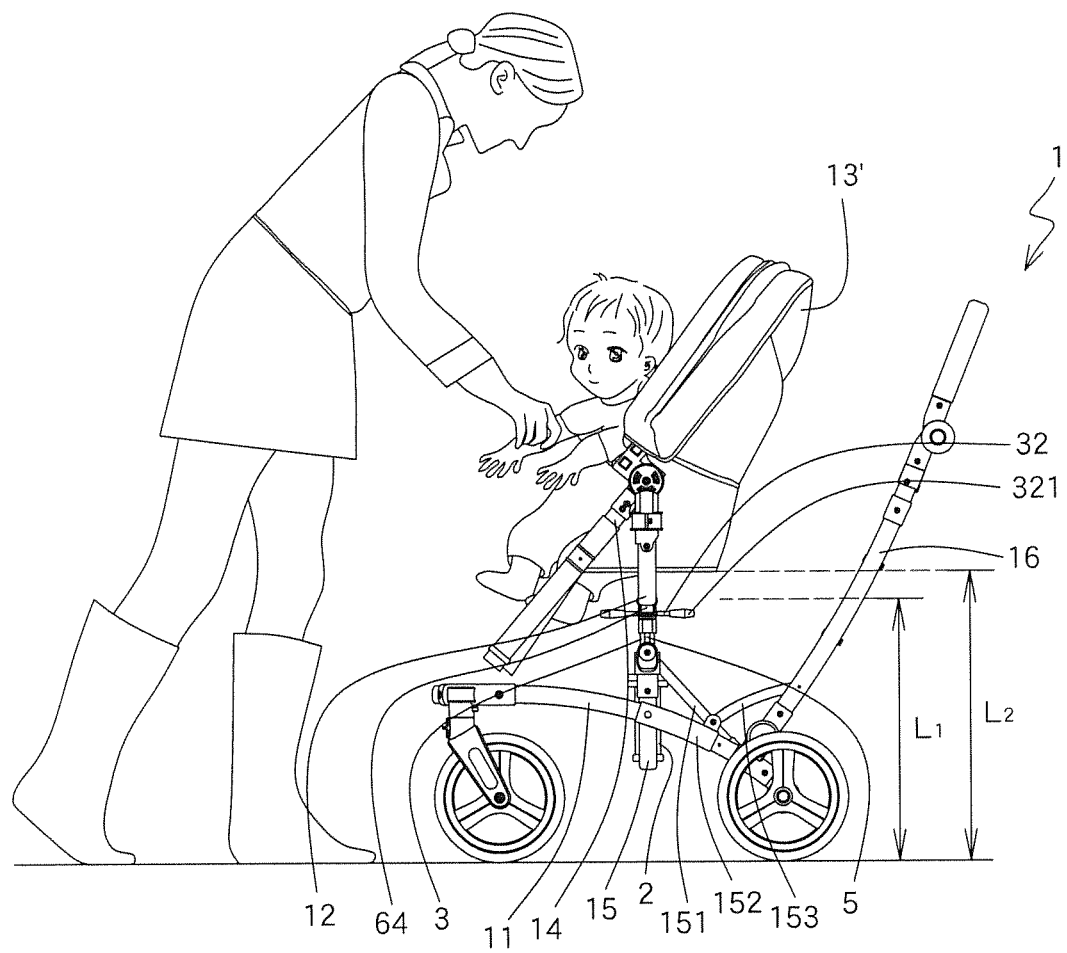
FIG. 12 is another view to show that the user does not need to bend her waist to access the baby in the seat which is tilt and positioned at a higher position.

As shown in FIG. 8, when adjusting the height of the support frame 12 and the seat 13' or the bed 13, the user operates the operation member 32 to activate the valve 31 so that the movable rod 3 is retractable relative to the suspension unit 2. Therefore, the position of the support frame 12 and the seat 13' or the bed 13 is adjusted. When the support frame 12 and the seat 13' or the bed 13 are adjusted to a desired position, the operation member 32 is again operated to shut off the valve 31, the position/height of the support frame 12 and the seat 13' or the bed 13 is set. As shown in FIGS. 9 and 10, when the user is tall or the height "L1" between the bed 13 and the road is too low, the movable rod 5 is adjusted as mentioned in FIGS. 7 and 8 to raise the bed 13 to the height "L2". As shown in FIGS. 11 and 12, the user does not need to bend too much to access the baby in the bed 13. On the contrary, when the bed 13 is located too high from the road, or the user is shorter, the height of the bed 13 may also be adjusted by the above-mentioned way to make the user to easily assess the baby in the bed 13.

The support frame 12 has a tube 6 which has a hole 61, the valve 31 is located on one side of the hole 61. The operation member 32 is connected to the hole 61 so that the operation member 32 can be conveniently operated. When the operation member 32 does not need to be operated, the lever 321 on the operation member 32 can be detached therefrom, and the operation member 32 can be pulled from the hole 51 for convenience of storage.

Figure 13:
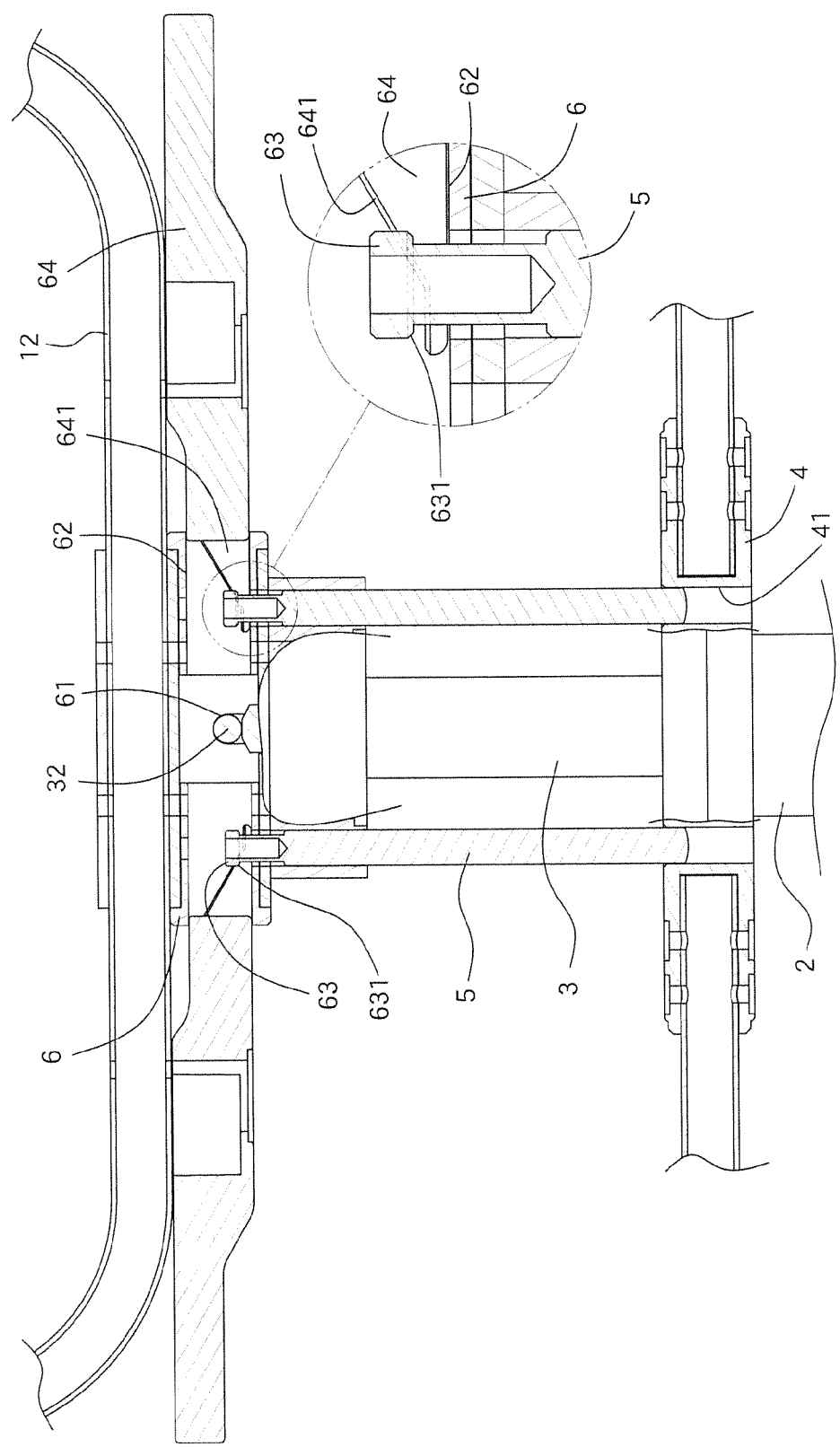
FIG. 13 is a cross sectional view to show that the control rods are in the locked position.
Figure 14:
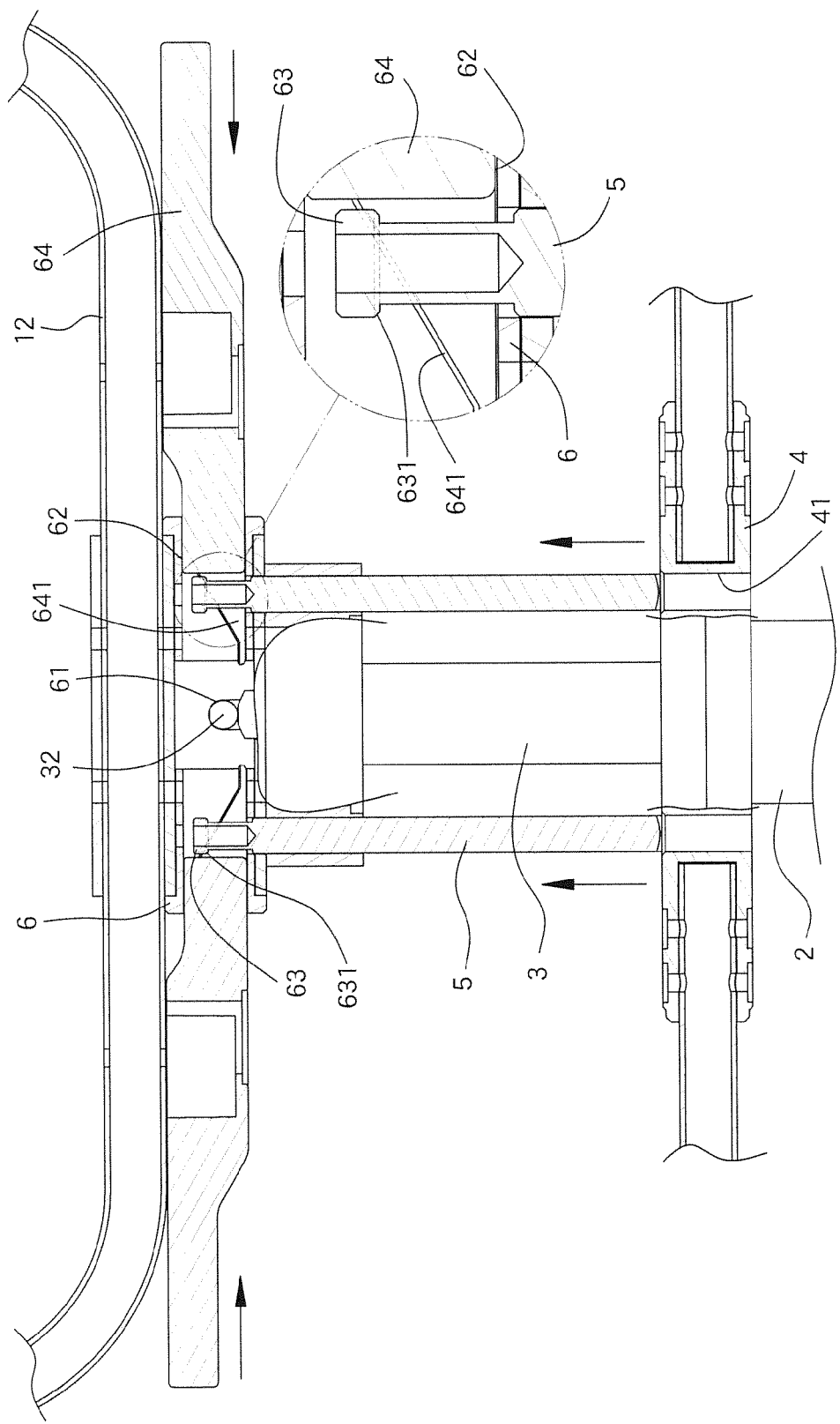
FIG. 14 is a cross sectional view to show that the control rods are in the unlocked position.
Figure 15:
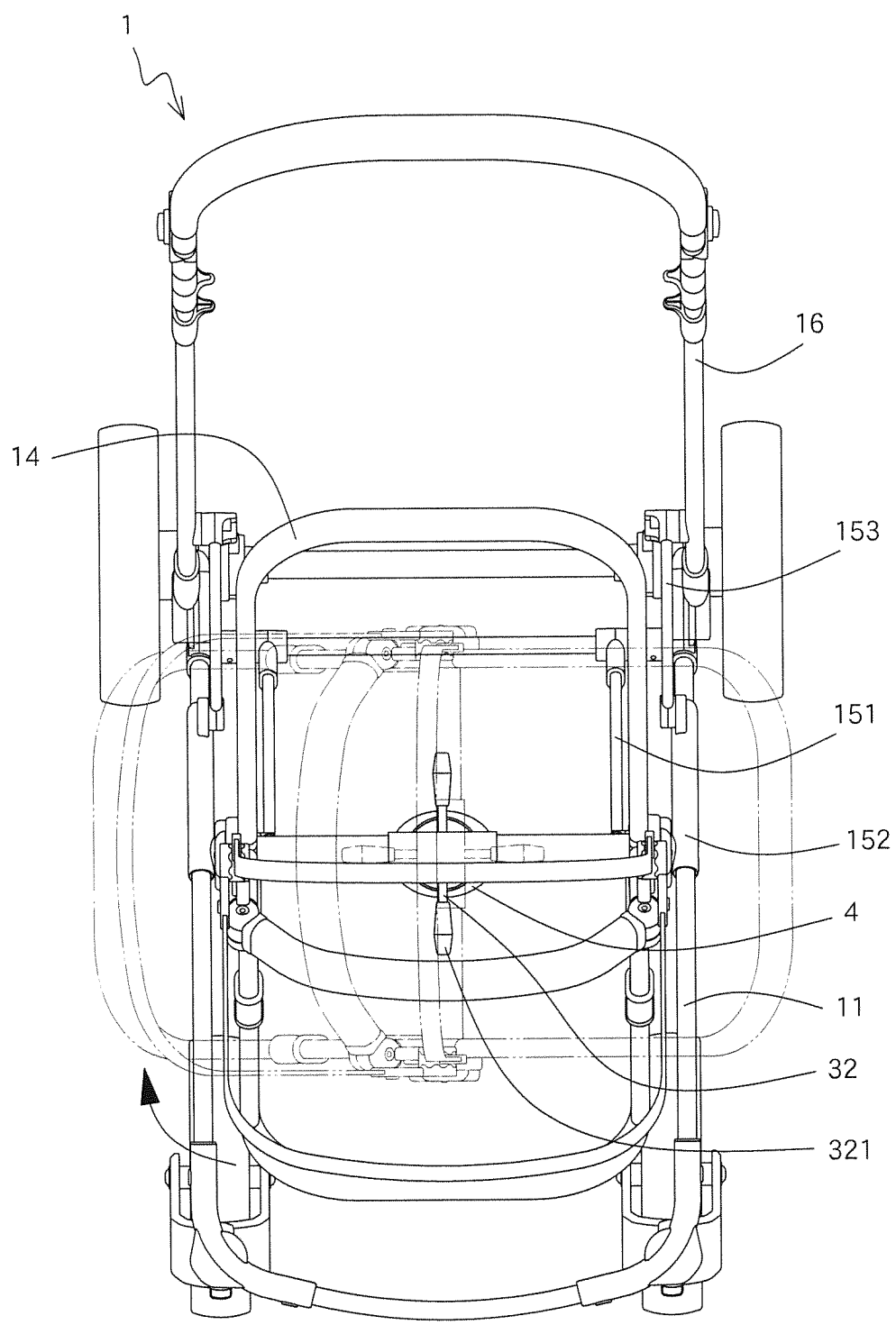
FIG. 15 is a top view to show that the support frame is rotated.
Figure 16:
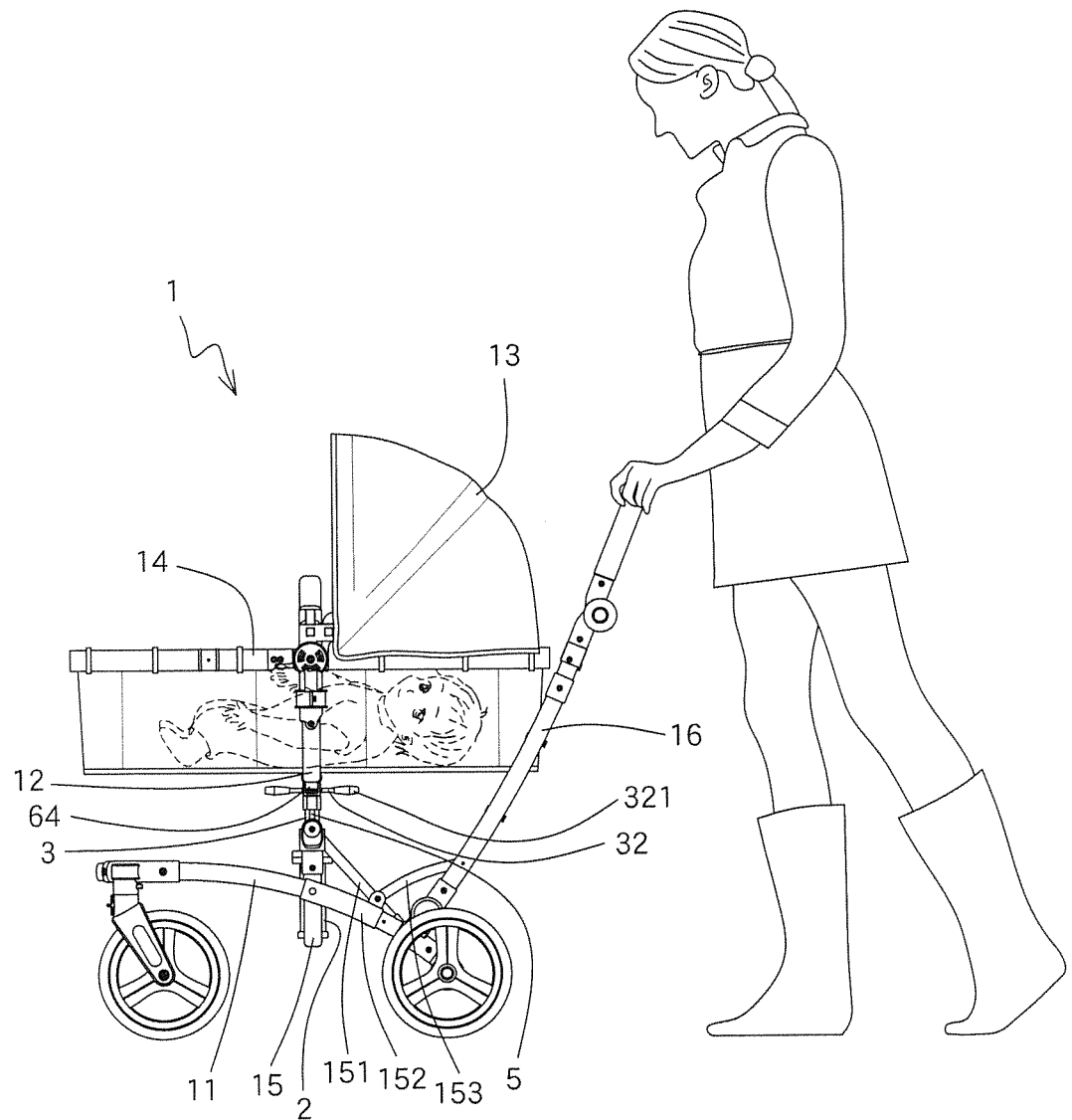
FIG. 16 shows that the bed is set at the horizontal position and the baby faces front.
Figure 17:
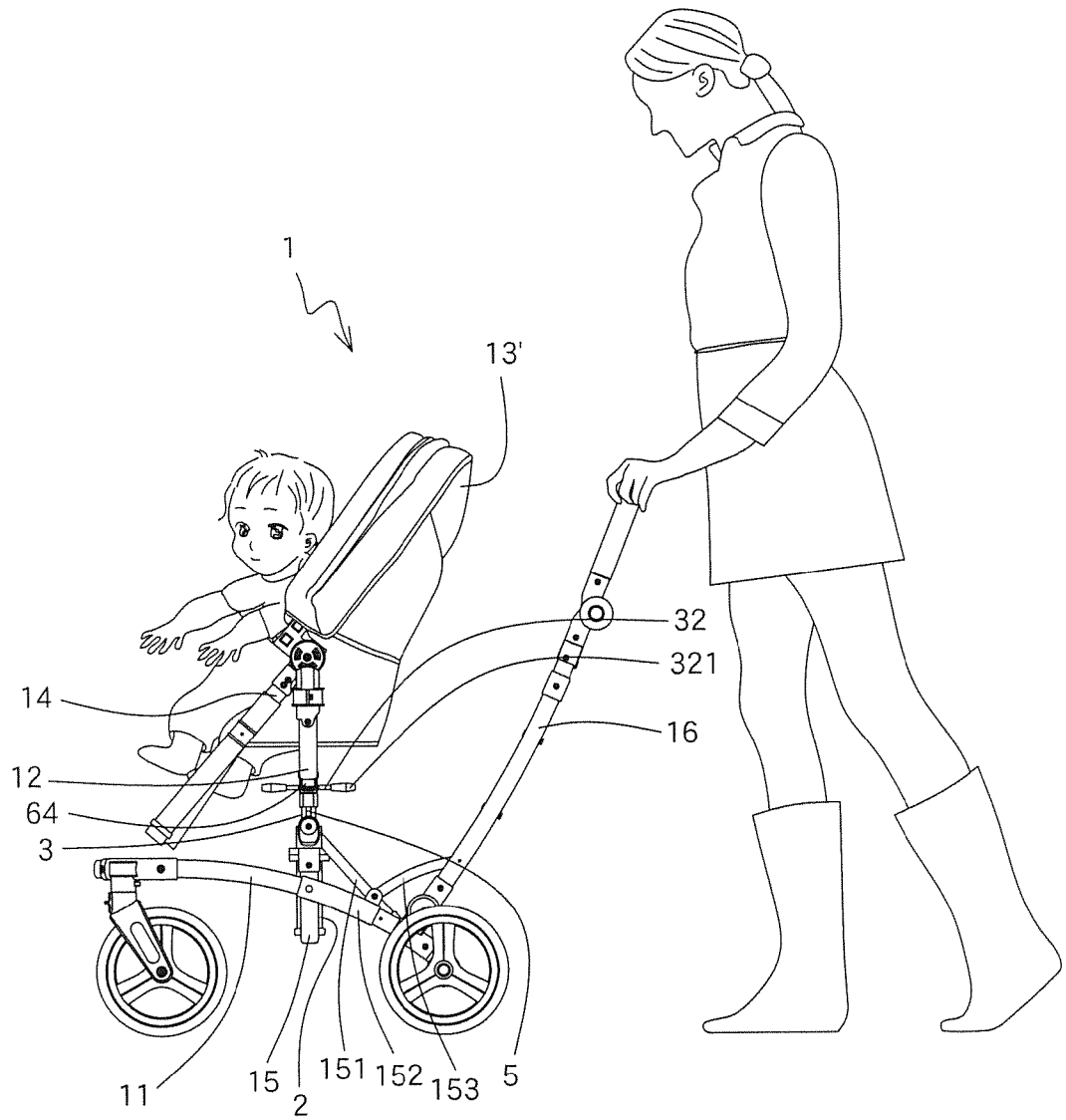
FIG. 17 shows that the seat is set at the tilt position and the baby faces front.
Figure 18:
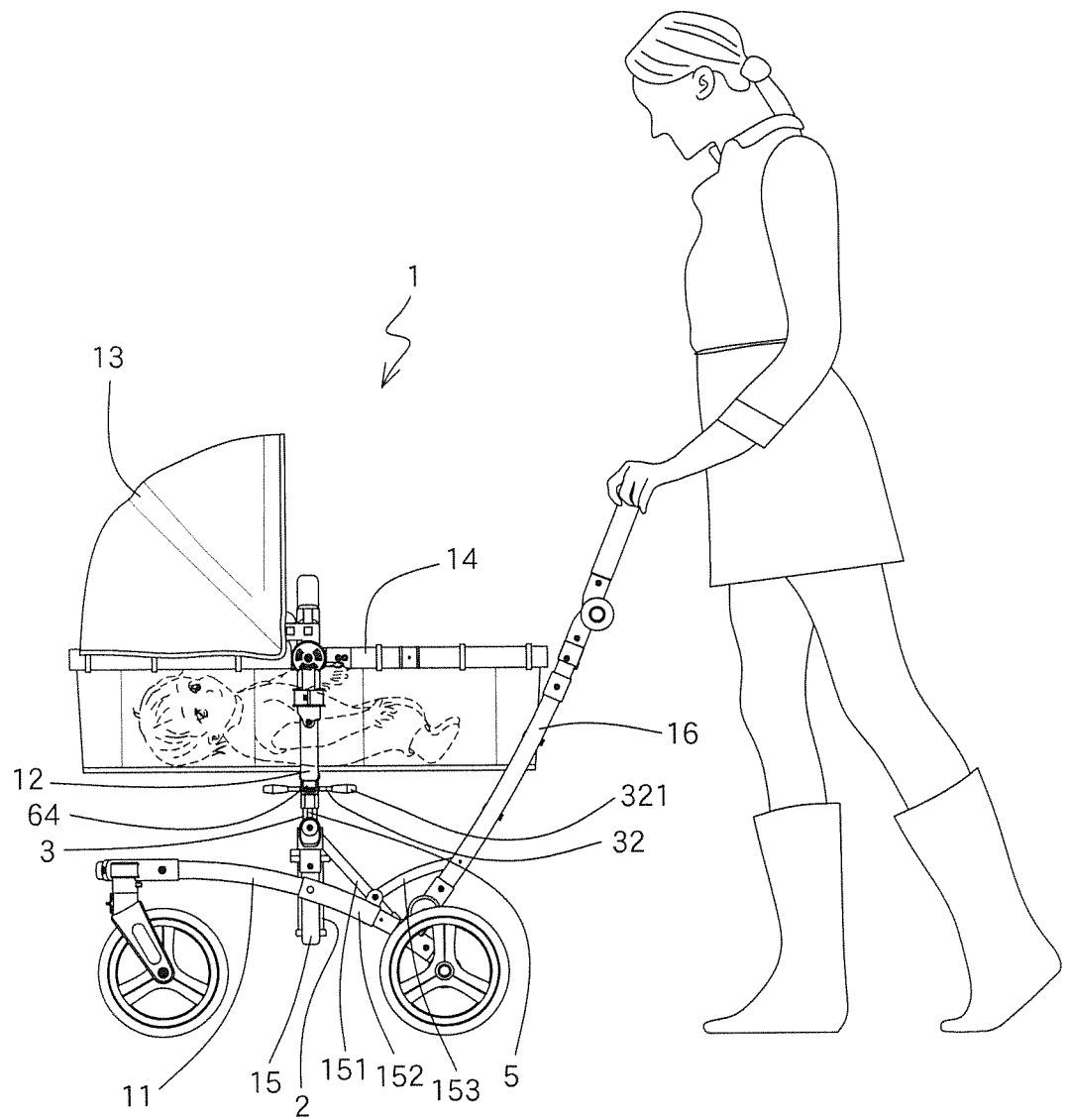
FIG. 18 shows that the bed is set at the horizontal position and the baby faces the user.
Figure 19:
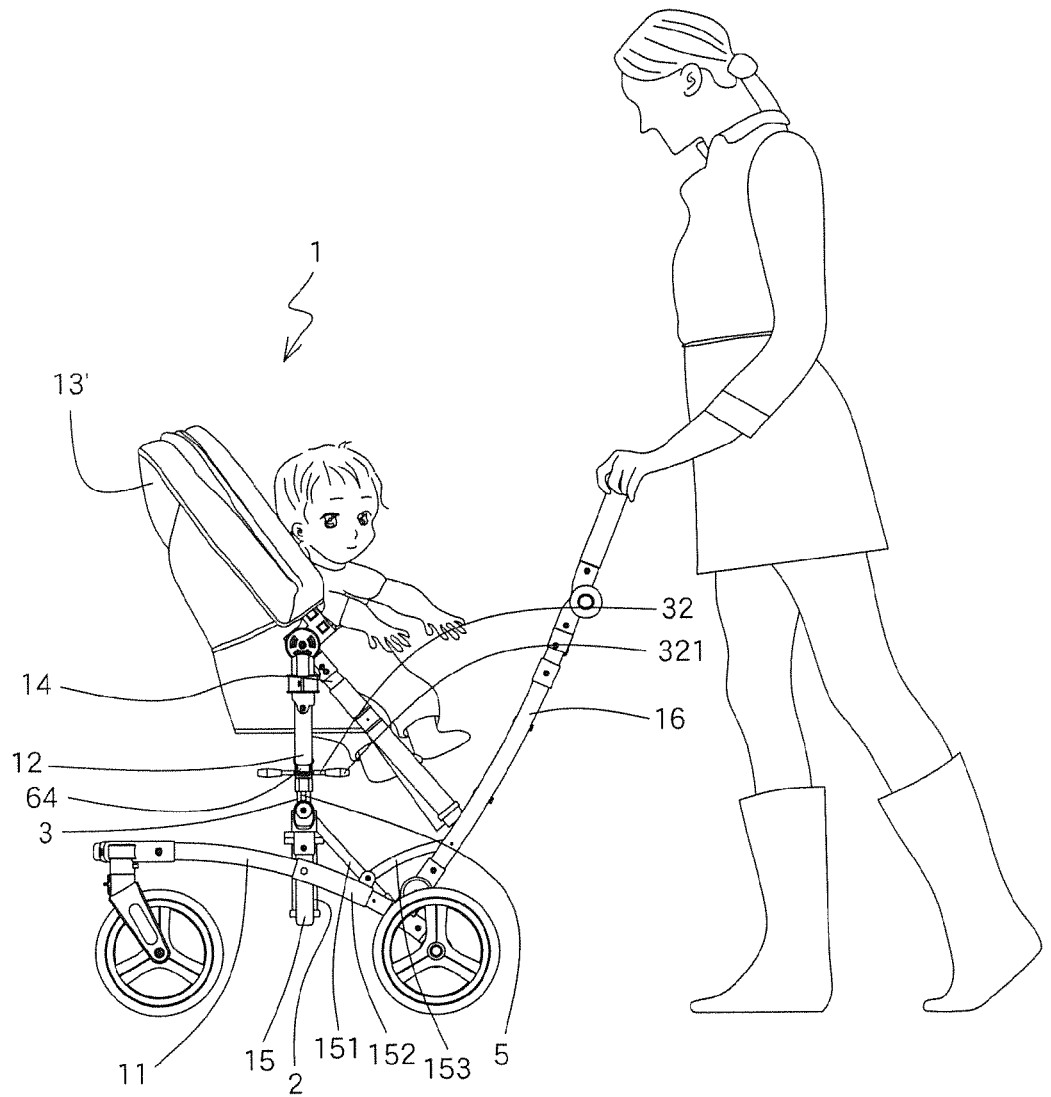
FIG. 19 shows that the seat is set at the tilt position and the baby faces the user.

For the rotation of the support member 12 and the bed 13, the tube 6 has a passage 62 defined axially therethrough. Two slides 63 are located in the passage 62 and connected to the control rods 5 respectively. The slides 63 each have a stepped face 631. Two movable blocks 64 are inserted into the passage 62 and located substantially perpendicular to the control rods 5. The movable blocks 64 each have a rail 641 which is an inclined surface and located corresponding to the stepped face 631 of the slide 63 corresponding thereto. The slides 63 are moved up and down when stepped faces 631 of the slides 63 are moved along the rails 641. As shown in FIG. 13, when the control rods 5 are located at the locked position, the stepped faces 631 of the slides 63 are not pushed by the rails 641, so that the control rods 5 are located in the restriction portions 41 and the support frame 12 cannot rotated along with the movable rod 3. As shown in FIG. 14, when the movable blocks 64 are pushed toward the tube 6, the stepped faces 631 of the slides 63 are pushed by the rails 641, so that slides 63 move upward along the rails 641, and the control rods 5 are moved upward and removed from the restriction portions 41 so as to be the unlocked position. Therefore, the support frame 12 and the bed 13 are rotated by the movable rod 3 as shown in FIG. 15. The seat 13' or the bed 13 can be set to let the baby face front as shown in FIGS. 16 and 17. Alternatively, the seat 13' or the bed 13 can also be set to let the baby face the user/parent as shown in FIGS. 18 and 19 such that the user/parent can see the baby and the baby is calm with his/her parent in sight. After the rotation action is finished, the user/parent pulls the movable blocks 64 back to their original positions. The movable blocks 64 each have be cooperated with a spring (not shown) to move the movable blocks 64 back to their original positions. As shown in FIG. 13, the slides 63 are not pushed downward by the rails 641, so that the operation rods 5 are moved downward and engaged with the restriction portions 41 to set the seat 13' or the bed 13.

While we have shown and described the embodiment in accordance with the present invention, it should be clear to those skilled in the art that further embodiments may be made without departing from the scope of the present invention.

What is claimed is:

1. A baby stroller comprising:
a base and a suspension unit connected to the base, the suspension unit having a movable rod which is movably connected to the suspension unit, and
a support frame connected to a distal end of the movable rod, a distance between the support frame and the base being adjusted by movement of the movable rod;
wherein the movable rod is rotatable relative to the suspension unit, a positioning seat mounted to the suspension unit and having at least one restriction portion, the support frame has at least one control rod which is located corresponding to the at least one restriction portion, the at least one control rod is connected to the at least one restriction portion when the at least one control rod is located at a locked position, the at least one control rod is disconnected from the at least one restriction portion when the at least one control rod is located at an unlocked position, the support frame is pivotable when the movable rod is pivoted; and
wherein the support frame has a tube which has at least one passage, at least one slide is located in the at least one passage and connected to the at least one control rod, the at least one slide has a stepped face, at least one movable block is inserted into the at least one passage and located substantially perpendicular to the at least one control rod, the at least one movable block has a rail which is an inclined surface and located corresponding to the stepped face of the at least one slide, the at least one slide is moved up and down when stepped face of the at least one slide is moved along the rail.

2. The baby stroller as claimed in claim 1, wherein the suspension unit is a pneumatic cylinder or a hydraulic cylinder.

3. The baby stroller as claimed in claim 2, wherein the movable rod is a piston rod of the pneumatic cylinder or the hydraulic cylinder, the movable rod has a valve which is connected to and controlled by an operation member.

4. The baby stroller as claimed in claim 3, wherein the support frame has a tube which has a hole, the valve is located on one side of the hole, the operation member is connected to the hole.

5. The baby stroller as claimed in claim 1, wherein a seat or a bed is connected to the support frame and located opposite to the suspension unit.

6. The baby stroller as claimed in claim 5, wherein a frame is connected to the support frame and the seat or the bed is connected to the frame.

7. A baby stroller comprising:
a base and a suspension unit connected to the base, the suspension unit having a movable rod which is movably connected to the suspension unit, and
a support frame connected to a distal end of the movable rod, a distance between the support frame and the base being adjusted by movement of the movable rod;
wherein the base has a support member and the suspension unit is connected to the support member; and
the support member has at least one first link and at least one sleeve, the at least one first link is pivotably connected to the frame, the at least one sleeve is slidably connected to the frame, when the at least one sleeve is moved toward an end of the at least one first link, the suspension unit is substantially perpendicular to the base, when the at least one sleeve is moved toward the other end of the at least one first link, the suspension unit is substantially parallel to the base.

8. The baby stroller as claimed in claim 7, wherein a seat or a bed is connected to the support frame and located opposite to the suspension unit.

9. The baby stroller as claimed in claim 7, wherein a frame is connected to the support frame and the seat or the bed is connected to the frame.

* * * * *